US008923858B2

(12) United States Patent
Perets et al.

(10) Patent No.: US 8,923,858 B2
(45) Date of Patent: Dec. 30, 2014

(54) PARALLEL MULTI-RAT PLMN SEARCH

(71) Applicant: Marvell International, Ltd., Hamilton (BM)

(72) Inventors: Yona Perets, Ra'anana (IL); David Ben-Eli, Modiin (IL); Shay Gershoni, Hadera (IL)

(73) Assignee: Marvell World Trade Ltd., St. Michael (BB)

( * ) Notice: Subject to any disclaimer, the term of this patent is extended or adjusted under 35 U.S.C. 154(b) by 34 days.

(21) Appl. No.: 13/766,798

(22) Filed: Feb. 14, 2013

(65) Prior Publication Data
US 2013/0217386 A1 Aug. 22, 2013

Related U.S. Application Data

(60) Provisional application No. 61/601,291, filed on Feb. 21, 2012.

(51) Int. Cl.
*H04W 60/00* (2009.01)
*H04W 48/16* (2009.01)
*H04W 88/06* (2009.01)

(52) U.S. Cl.
CPC .............. *H04W 60/00* (2013.01); *H04W 88/06* (2013.01); *H04W 48/16* (2013.01)
USPC ........................................................ 455/434

(58) Field of Classification Search
USPC ................. 455/434, 436–439, 160.1, 161.1–3
See application file for complete search history.

(56) References Cited

U.S. PATENT DOCUMENTS

| 6,542,716 | B1* | 4/2003 | Dent et al. | 455/13.1 |
|---|---|---|---|---|
| 7,035,646 | B2* | 4/2006 | Raffel et al. | 455/456.1 |
| 7,577,188 | B1 | 8/2009 | Lewis | |
| 8,311,576 | B2 | 11/2012 | Islam et al. | |
| 8,626,169 | B2* | 1/2014 | Lee et al. | 455/437 |
| 2004/0253952 | A1 | 12/2004 | Rager et al. | |
| 2005/0075125 | A1 | 4/2005 | Bada et al. | |
| 2006/0068782 | A1 | 3/2006 | Kuriyama | |
| 2007/0211669 | A1 | 9/2007 | Umatt et al. | |
| 2007/0253319 | A1 | 11/2007 | Jansen | |
| 2009/0124224 | A1 | 5/2009 | Hildebrand et al. | |

(Continued)

FOREIGN PATENT DOCUMENTS

| EP | 1422962 A1 | 5/2004 |
|---|---|---|
| WO | 03063538 A1 | 7/2003 |
| WO | 2011068557 A1 | 6/2011 |

OTHER PUBLICATIONS

International Application PCT/IB2012/053812 search report dated Dec. 3, 2012.

(Continued)

*Primary Examiner* — Cong Tran

(57) ABSTRACT

A method includes, in a mobile communication terminal, receiving signals in a frequency band. One or more lists of entries are generated based on the received signals, each entry specifying a respective frequency channel suspected of containing a carrier of a respective Radio Access Technology (RAT). At least some of the entries are scanned in accordance with a scanning order that alternates from a first RAT to a second RAT before scanning all the entries of the first RAT. For each scanned entry, detection is made whether the respective frequency channel actually contains the carrier of the respective RAT. The detection of the carriers in the frequency band is output.

18 Claims, 2 Drawing Sheets

(56) References Cited

U.S. PATENT DOCUMENTS

| | | |
|---|---|---|
| 2009/0156206 A1 | 6/2009 | Rathonyi et al. |
| 2009/0270103 A1 | 10/2009 | Pani et al. |
| 2009/0298497 A1 | 12/2009 | Lee |
| 2010/0081433 A1 | 4/2010 | Lee |
| 2010/0091674 A1 | 4/2010 | Sjogren et al. |
| 2010/0099399 A1 | 4/2010 | Nayak et al. |
| 2010/0216460 A1 | 8/2010 | Wu |
| 2010/0330977 A1 | 12/2010 | Kadous et al. |
| 2011/0122976 A1 | 5/2011 | Lei et al. |
| 2011/0263252 A1 | 10/2011 | Saini et al. |
| 2012/0128086 A1 | 5/2012 | Bouzegzi et al. |
| 2012/0140799 A1 | 6/2012 | Lim et al. |
| 2012/0236919 A1 | 9/2012 | Alliot et al. |
| 2012/0264425 A1 | 10/2012 | Krishnamoorthy et al. |
| 2013/0028119 A1 | 1/2013 | Ben-Eli et al. |

OTHER PUBLICATIONS

EP Patent Application # 13156182.1 search report dated May 16, 2013.
3GPP TS 36.101, "3rd Generation Partnership Project: Technical Specification Group Radio Access Network; Evolved Universal Terrestrial Radio Access (E-UTRA); User Equipment (UE) Radio Transmission and reception (release 10)", version 10.3.0, Jun. 2011.
3GPP TS 25.101, "3rd Generation Partnership Project: Technical Specification Group Radio Access Network; User Equipment (UE) Radio Transmission and Reception (FDD) (release 10)", version 10.2.0, Jun. 2011.
3GPP TS 45.005, "3rd Generation Partnership Project: Technical Specification Group GSM/EDGE Radio Access Network; Radio Transmission and Reception (release 10)", version 10.1.0, May 2011.
U.S. Appl. No. 13/558,351 Office Action dated Mar. 12, 2014.

\* cited by examiner

PARALLEL MULTI-RAT PLMN SEARCH

CROSS-REFERENCE TO RELATED APPLICATIONS

This application claims the benefit of U.S. Provisional Patent Application 61/601,291, filed Feb. 21, 2012, whose disclosure is incorporated herein by reference.

FIELD OF THE DISCLOSURE

The present disclosure relates generally to wireless communication, and particularly to methods and systems for wireless network selection.

BACKGROUND

Some wireless communication terminals, such as cellular phones, are able to communicate over multiple frequency bands and multiple Radio Access Technologies (RATs). Examples of RATs are Universal Terrestrial Radio Access (UTRA), also referred to as Wideband Code Division Multiple Access (WCDMA), and Evolved UTRA (E-UTRA), also referred to as Long Term Evolution (LTE) or LTE-Advanced (LTE-A). The specification of each RAT includes a set of operating Radio frequency (RE) bands.

The operating bands for UTRA are specified, for example, in "3$^{rd}$ Generation Partnership Project; Technical Specification Group Radio Access Network; User Equipment (UE) radio transmission and reception (FDD) (Release 10)," 3GPP specification TS 25.101, version 10.2.0, June, 2011, which is incorporated herein by reference. Section 5 of this standard specifies uplink and downlink frequency bands that may be allocated to WCDMA networks.

For E-UTRA, the operating bands are specified, for example, in "3$^{rd}$ Generation Partnership Project; Technical Specification Group Radio Access Network; Evolved Universal Terrestrial Radio Access (E-UTRA); User Equipment (CE) radio transmission and reception (Release 10)," 3GPP specification TS 36.101, version 10.3.0, June, 2011, which is incorporated herein by reference. Section 5 of this standard specifies uplink and downlink frequency bands that may be allocated to LTE networks.

The description above is presented as a general overview of related art in this field and should not be construed as an admission that any of the information it contains constitutes prior art against the present patent application.

SUMMARY

An embodiment that is described herein provides a method in a mobile communication terminal. The method includes receiving signals in a frequency band. One or more lists of entries are generated based on the received signals, each entry specifying a respective frequency channel suspected of containing a carrier of a respective Radio Access Technology (RAT). At least some of the entries are scanned in accordance with a scanning order that alternates from a first RAT to a second RAT before scanning all the entries of the first RAT. For each scanned entry, detection is made whether the respective frequency channel, actually contains the carrier of the respective RAT. The detection of the carriers in the frequency band is output.

In some embodiments, generating the lists includes generating respective likelihood scores for the entries, and scanning the entries includes traversing the lists in descending order of the likelihood scores. In an embodiment, generating the lists includes estimating a power spectrum of the frequency band, and processing the estimated power spectrum so as to generate the lists. In another embodiment, scanning the entries includes attempting to decode, on the frequency channel of a scanned entry, concurrently, first and second RAT identification codes in accordance with the first and second RATs, respectively.

In some embodiments, scanning the entries includes attempting to detect only the first RAT on the frequency channel when a suspected bandwidth of the frequency channel of the scanned entry matches only the first RAT; and, when the suspected bandwidth of the frequency channel matches both the first RAT and the second RAT, initially attempting to detect one of the first and second RATs on the frequency channel, and subsequently attempting to detect the other of the first and second RATs on the frequency channel. In a disclosed embodiment, scanning the entries includes defining the scanning order so as to alternate between a first predefined number of the entries corresponding to the first RAT and a second predefined number of the entries corresponding to the second RAT.

In another embodiment, scanning the entries includes, in response to successfully detecting one of the carriers on a given frequency channel, removing from the list one or more entries whose frequency channels overlap the given frequency channel at least partially. In an example embodiment, removing the entries includes removing all the entries whose frequency channels overlap the given frequency channel at least partially, irrespective of the RATS of the removed entries. In an embodiment, the method further includes defining the scanning order for alternating between the RATs based on a-priori information relating to RATs operating in the frequency band.

There is additionally provided, in accordance with an embodiment that is described herein, apparatus including a receiver front end and processing circuitry. The receiver front end is configured to receive signals in a frequency band. The processing circuitry is configured to generate, based on the received signals, one or more lists of entries, each entry specifying a respective frequency channel suspected of containing a carrier of a respective Radio Access Technology (RAT), to scan at least some of the entries in accordance with a scanning order that alternates from a first RAT to a second RAT before scanning all the entries of the first RAT, and to detect, for each scanned entry, whether the respective frequency channel actually contains the carrier of the respective RAT.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Mobile communication terminals typically support a process of searching the operating bands they support, in order to select a suitable Public Land Mobile Network (PLMN) on which to operate. Such a process is referred to as PLMN search. PLMN search is performed, for example, at power-up, during roaming, after return from out-of-service conditions, in emergency mode or at the request of the user. When the terminal supports multiple bands and/or multiple RATS, the PLMN search process may be long and power consuming.

Embodiments that are described herein provide improved methods and systems for performing PLMN search in mobile communication terminals. The disclosed embodiments focus on frequency bands that potentially contain PLMNs of more than one RAT, for example frequency bands that may be allocated to both WCDMA and LTE networks. In the disclosed embodiments, the mobile communication terminal searches such a frequency band while alternating between RATs as needed, instead of searching the entire frequency band for carriers of a certain RAT before switching to another RAT.

Several example search orders and search techniques that alternate between RATs are described herein. In some embodiments, the terminal assigns likelihood scores to respective frequency channels in the band. Each score indicates the likelihood that the respective channel actually contains a carrier of a certain RAT. The terminal then evaluates the channels in accordance with the scores, while alternating between RATs if necessary.

In an embodiment, the terminal circuitry is able to evaluate two or more RATs on a given channel simultaneously. In another embodiment, when the terminal identifies a PLMN on a given channel, it removes adjacent channels from the search regardless of their RAT or score. In yet another embodiment, the terminal evaluates a predefined number of highest-score channels of a given RAT and only then switches to evaluate the highest-score channels of another RAT. This technique reduces various overheads associated with RAT switching. In various embodiments, the terminal may use different combinations of the above techniques.

The methods and systems described herein reduce the average PLMN search time considerably in comparison with conventional methods, because they are not constrained to complete evaluation of a certain RAT before switching to another RAT. As a result, user experience is enhanced because the terminal is quickly able to find a suitable PLMN. In addition, the disclosed techniques reduce the battery power consumed by the PLMN search process.

Figure 1:
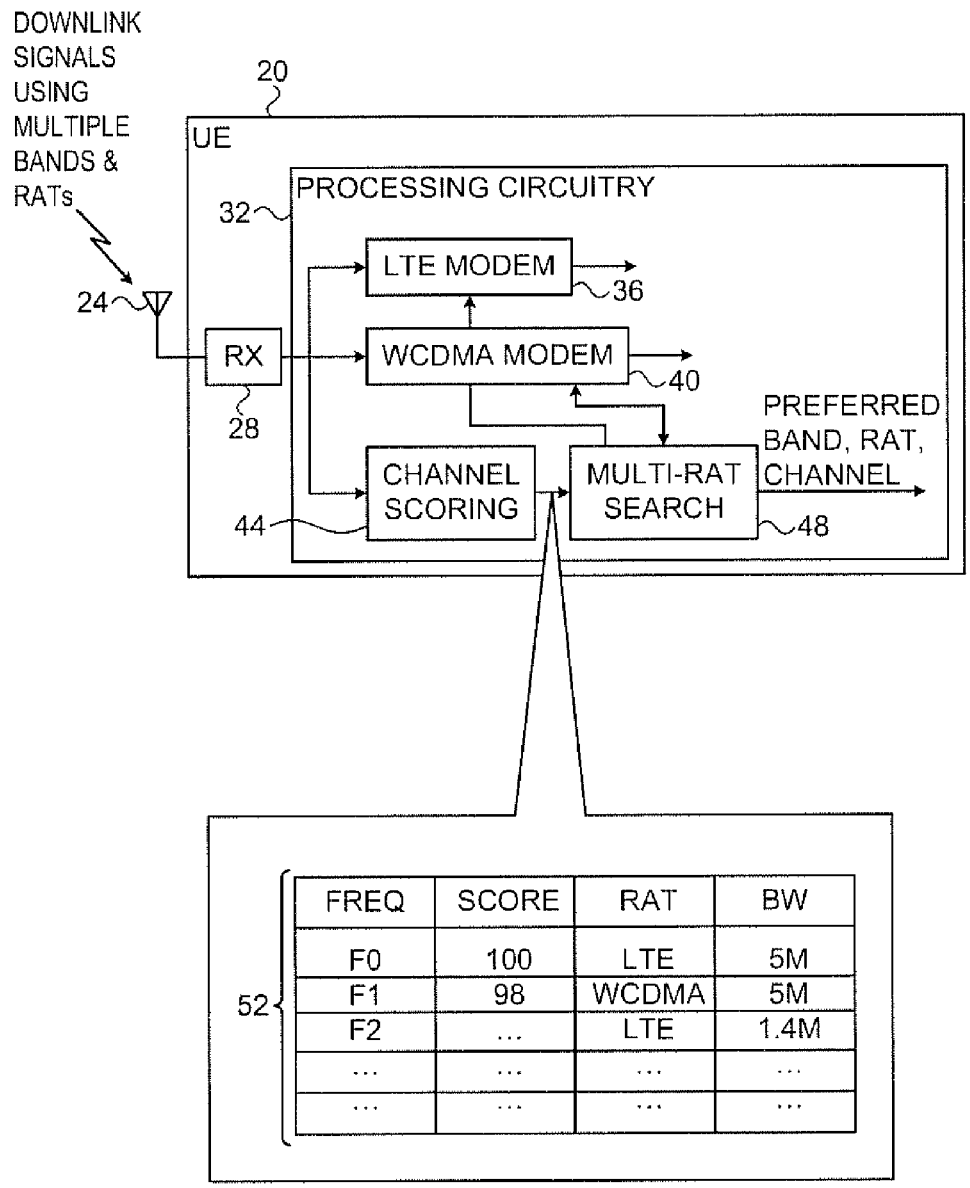
FIG. 1 is a block diagram that schematically illustrates a mobile communication terminal, in accordance with an embodiment that is described herein.

FIG. 1 is a block diagram that schematically illustrates a mobile communication terminal 20, in accordance with an embodiment that is described herein. In the present example, terminal 20 comprises a multi-RAT User Equipment (UE) that is configured at least to operate on UTRA (WCDMA) and E-UTRA (LTE or LTE-A) networks. In alternative embodiments, terminal 20 may comprise a multi-RAT terminal that operates in accordance with any other suitable communication standard or protocol. Terminal 20 may comprise, for example, a cellular phone, a wireless-enabled mobile computing device such as a laptop or tablet computer, or any other suitable type of terminal.

UE 20 comprises an antenna 24, a receiver (RX) 28 and processing circuitry 32. Receiver 28 receives downlink Radio Frequency signals from one or more base stations via antenna 21. The receiver down-converts the RF signals to baseband, digitizes the baseband signals, and typically performs additional functions such as filtering, low-noise amplification and gain control. Processing circuitry 32 processes the received baseband signals. Among other functions, the processing circuitry selectively carries out a PLMN search process using methods that are described herein.

In the present example, processing circuitry 32 comprises an LTE modem 36 that decodes and demodulates LTE channels in accordance with the LTE specifications, and a WCDMA modem 10 that decodes and demodulates WCDMA channels in accordance with the WCDMA specifications. (LTE modem 36 and WCDMA modem 10 are shown in the figure as separate units for the sake of clarity. In alternative embodiments, modems 36 and 40 are implemented in a single modem unit and possibly share common circuit elements or resources.) In addition to receiving the appropriate channels during communication over LTD or WCDMA networks, modems 36 and 10 assist in identifying PLMNs as part of the PLMN search process.

A channel souring module 44 performs initial analysis of the frequency channels in the received signal and assigns respective likelihood scores to at least some of the channels, in an embodiment. When searching a certain band, scoring module 44 typically estimates the Power Spectral Density (PSD) as a function of frequency for the band in question. Based on analysis of the estimated spectral, density, scoring module 11 produces one or more lists 52 of candidate frequency channels that are suspected of containing a WCDMA or LTD carrier. The lists comprise one or more parameters for each candidate channel, such as RAT, channel bandwidth and likelihood score.

Typically, in an embodiment, module 44 assigns respective likelihood scores to the candidate channels, using any suitable criterion. Each score indicates the likelihood (e.g., between 0-100) that the channel indeed contains a WCDMA carrier, or the likelihood that the channel contains an LTE carrier. It is possible that the same channel will be assigned a likelihood score of containing a WCDMA carrier, and another score (possibly different) of containing an LTE carrier.

The scores may be assigned in accordance with any suitable metric or criterion. In one example embodiment, the Likelihood score of a channel with respect to a certain RAT is indicative of the distance between the estimated power spectrum for the channel and the power spectrum of an ideal CDMA carrier, after gain normalization that minimizes the distance. In an embodiment, this distance is given by $$\text{Score(carrier)} = \min_g \left\{ \sum_{f \text{ in signal BW}} |MeasuredPSD(\text{carrier} + f) - g \cdot IdealPSD(f)|^2 \right\} \quad \text{Equation 1}$$

Thus, scoring module 44 produces one or more Lists 52 of entries. Each entry specifies a respective frequency channel, a RAT and a likelihood score that this frequency channel indeed contains a carrier of this RAT. In an embodiment, module 14 produces a single list 52 whose entries correspond to the multiple RATs. In this embodiment the list is typically ordered in descending order of the likelihood scores, such that the highest-scoring channels appear first irrespective of RAT. In another embodiment, module 44 produces a separate list for each RAT. In this embodiment, the entries in each list are ordered in descending order of the scores.

In some embodiments, a RAT specifies carriers of various bandwidths. For example, the LTE specifications specify LTE carriers having bandwidths of 1.4, 3, 5, 10 15 and 20 MHz. Thus, each list entry also specifies the carrier bandwidth (BW) for the candidate channel, in some embodiments.

A multi-RAT search module 48 accepts a list or lists 52 as input, and performs PLMN search using the list entries. When searching a given band, the search order used by module 48 generally follows the scores assigned to the candidate channels, and alternates from RAT to RAT as needed. In performing the search, module 48 typically switches from a first RAT to a second RAT before scanning all the entries of the first RAT. Several examples of such search orders are described further below. Module 48 outputs one or more preferred PLMNs, along with corresponding PLMN parameters such as the band and frequency channel of the preferred carrier of the preferred PLMN.

The UE configuration shown in FIG. 1 is an example configuration, which is depicted solely for the sake of clarity. In alternative embodiments, any other suitable UE configuration can be used. For example, in an embodiment the disclosed techniques are implemented using more than two RATs.

Some FE elements that are not mandatory for understanding of the disclosed techniques have been omitted from the figures for the sake of clarity. The different FE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some FE elements may be implemented using software executing on programmable hardware, or using a combination of hardware and software elements.

In some embodiments, some elements of UE 20 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
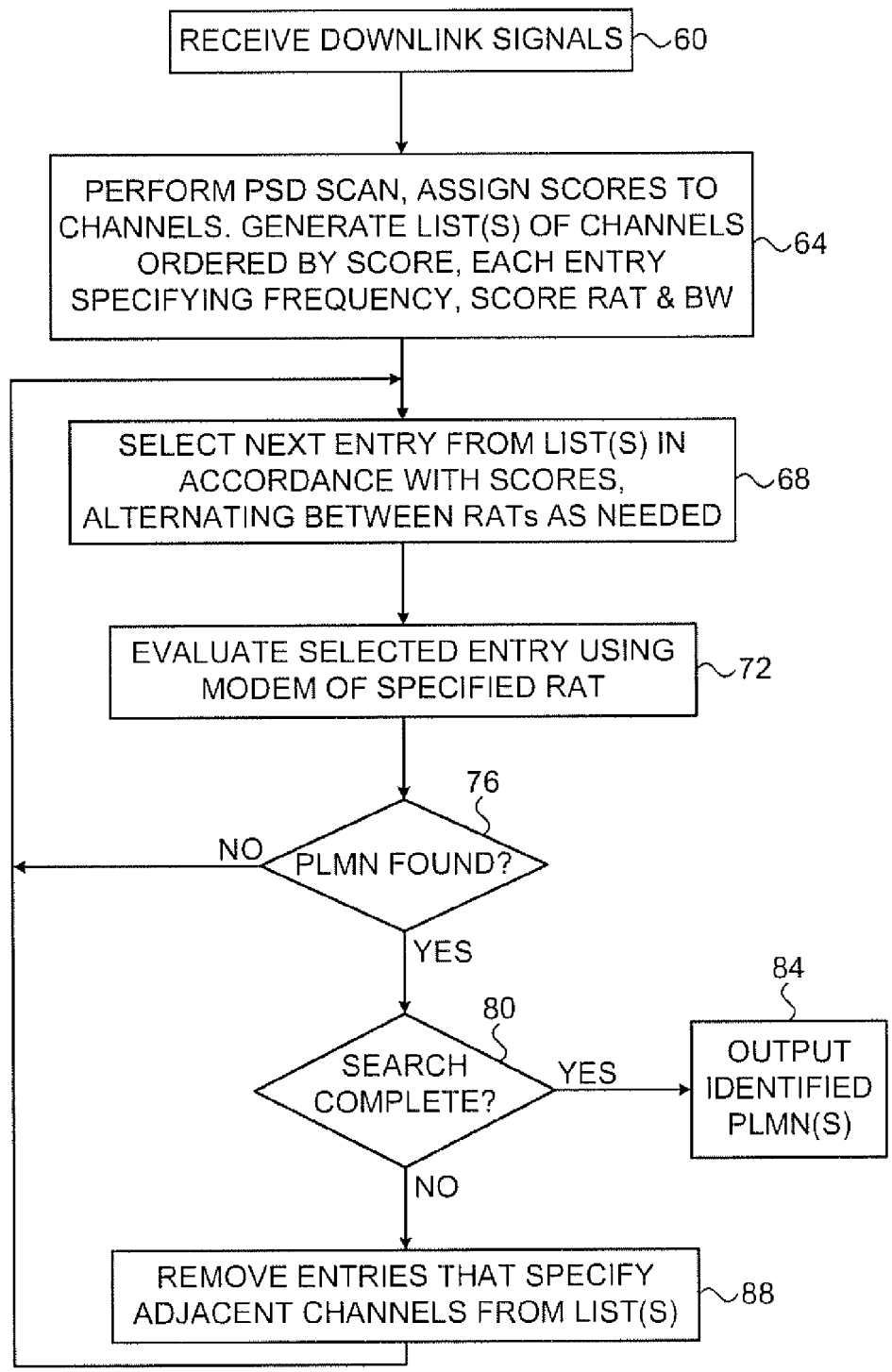
FIG. 2 is a flow chart that schematically illustrates a method for PLMN search, in accordance with an embodiment that is described herein.

FIG. 2 is a flow chart that schematically illustrates a method for PLMN search, in accordance with an embodiment that is described herein. The method begins with receiver 28 receiving a downlink signal, at a reception operation 60. At a scoring operation 64, channel scoring module 44 selects candidate channels in the band and assigns them respective likelihood scores.

Typically, module 44 performs a power spectrum scan of the bands. Based on the power spectrum scan, module 44 selects candidate channels and produces one or more lists 52 of candidate channels and corresponding parameters (e.g., score, RAT and bandwidth). After module 44 produces and outputs the list lists, multi-RAT search module 48 uses this information to search for PLMNs.

Typically, module 48 selects the next highest-score entry from list or lists 52, at a selection operation 68. If necessary (e.g., if the previously-evaluated entry had a different RAT), module 48 switches to the RAT of the currently-selected entry. Switching from one RAT to another may involve, for example, disabling one of modems 36 or 40 and activating the other modem.

At an evaluation operation 72, search module 48 evaluates whether the channel specified in the selected entry indeed contains a carrier of the RAT specified in the entry. Typically, module 48 controls the modem of the corresponding RAT (modem 36 or 40) to try and demodulate a carrier on the selected channel. The modem typically attempts to decode a RAT identification code transmitted on the carrier, so as to identify the presence of a carrier of the RAT. The modem reports success or failure to module 48 (possibly together with parameters of the identified carrier in case of success).

If no PLMN is found by evaluating the selected entry, as checked at a checking operation 76, the method loops back to operation 68 above for selecting the next list entry.

If, on the other hand, module 48 concludes that a carrier of the specified RAT was found on the selected channel, module 48 checks whether the search is complete, at a completion checking operation 80. In an example embodiment, module 48 decides that the search is completed upon exhausting the entries, after evaluating a predefined number of entries, or based on any other suitable criterion. If the search is completed, module 48 outputs the identified PLMN or PLMNs and the associated parameters, at an output operation 84, and the method terminates. In an alternative embodiment, module outputs each identified PLMN as soon as it is identified, without waiting for the search to end.

If a carrier (and thus a PLMN) is found on the specified channel, module 48 removes adjacent channels, which at least partially overlap the bandwidth of the identified carrier, from the list or lists, at a removal operation 88. The rationale for this technique is that nearby cells will not be assigned overlapping channels in order to avoid interference. When using separate lists 52 for different RATs, module 48 removes adjacent channels from all the lists. The removed channels are eliminated from the search, and search time is therefore reduced. The method then loops back to operation 68 above for selecting the next list entry for evaluation.

As noted above, an LTE carrier may occupy a bandwidth of 1.4, 3, 5, 10, 15 or 20 MHz. Regardless of the carrier bandwidth, however, the synchronization information and broadcast channel of the carrier is always transmitted in the central 1.1 MHz. In order to evaluate whether a candidate channel contains an LTE carrier of any bandwidth, it is sufficient for UE 20 to decode the central 1.4 MHz. WCDMA carriers, on the other hand, have a single possible bandwidth of 5 MHz.

In some embodiments, processing circuitry 32 of UE 20 controls receiver 28 to receive a certain 5 MHz channel. From the same digitized signal of this channel, LTE modem 36 decodes the center 1.1 MHz in order to decode an LTE carrier, and WCDMA modem 40 decodes the entire 5 MHz in order to decode a WCDMA carrier.

In some embodiments, modems 36 and 40 are capable of operating concurrently on the digital 5 MHz signal of a selected channel. Modems 36 and 40 use the signal in parallel to try and identify a carrier of the respective RATs. By evaluating both RATs simultaneously on the selected channel, search time is reduced. In these embodiments, if using a single list of entries, module 48 scans the list in descending order of scores. If two of the scanned entries specify the same channel frequency but different RATs, module 48 instructs modems 36 and 40 to evaluate in parallel whether a carrier is present on this channel.

In some embodiments, receiver 28 is tuned at a channel spacing of 20 MHz (the widest LTE bandwidth), and processing circuitry 32 decimates the desired 5 MHz WCDMA channels from the 20 MHz digital signal.

In alternative embodiments, however, only one of the two modems is capable of operating at a given time, for example when parts of the modem circuitry are shared between the modems. In these embodiments, module 48 may identify entries in the two lists that correspond to the same channel frequency but different RATs, and instruct modems 36 and 40 to evaluate these entries serially.

In another embodiment, UE 20 uses a single list of entries, and is configured to give preference (based on any suitable criterion) to one of the RATs in evaluating candidate channels. If module 18 identifies a frequency channel that appears on the list as both a candidate for an LTE PLMN and a candidate for a WCDMA PLMN, it first evaluates the high-priority RAT. Only if evaluation of the high-priority RAT fails, module 48 proceeds to evaluate the other RAT.

In some embodiments, scoring module 44 generates a separate ordered list, of entries for each RAT, and each list is divided into two sub-lists. For each RAT, the first sub-list comprises a predefined number of the highest-score entries, and the second sub-list comprises the remaining entries. In an example embodiment, the first sub-list of each RAT comprises the ten highest-score entries of that RAT. Generally, however, the number of entries in the first sub-list may be the same or different for different RATs. Each sub-list may comprise any desired number of entries, including a single entry in some embodiments.

In these embodiments, search module 18 first evaluates the entries on the first sub-list, of one RAT, then the entries on the first sub-list of the other RAT, then the entries on the second sub-list of the first RAT, and finally the entries on the second sub-list of the second RAT.

This technique provides a trade-off between unconstrained alternation from RAT to RAT, and between fully-serial RAT searching. Such a trade-off is suitable, for example, when RAT switching incurs time or other performance penalties. Evaluating a certain number of entries associated with a first RAT before alternating to evaluate a second RAT reduces this penalty. In alternative embodiments, processing circuitry 32 may use any other suitable scheme that alternates between RATs only after evaluating a predefined number of entries.

In any of the above schemes, whenever module 48 identifies a carrier of a certain RAT, it removes entries whose bandwidth overlap the bandwidth of the identified carrier, in an embodiment.

In any of the above schemes, processing circuitry 32 sets or modifies the search order based on a-priori information relating to RATs operating in the band. In an example embodiment, processing circuitry 32 maintains a list of PLMNs that were previously found in the band, together with their known RAT parameters and bandwidths. The processing circuitry then searches the known PLMNs using these parameters, before starting to search using lists 52.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a mobile communication terminal, receiving signals in a frequency band;
based on the received signals, generating one or more lists of entries, each entry specifying a respective frequency channel suspected of containing a carrier of a respective Radio Access Technology (RAT), and generating respective likelihood scores for the entries;
scanning at least some of the entries in accordance with a scanning order that traverses the lists in descending order of the likelihood scores and alternates from a first RAT to a second RAT before scanning all the entries of the first RAT, and, for each scanned entry, detecting whether the respective frequency channel actually contains the carrier of the respective RAT; and
outputting a detection of the carriers in the frequency band.

2. The method according to claim 1, wherein scanning the entries comprises attempting to decode, on the frequency channel of a scanned entry, concurrently, first and second RAT identification codes in accordance with the first and second RATs, respectively.

3. The method according to claim 1, wherein scanning the entries comprises:
when a suspected bandwidth of the frequency channel of the scanned entry matches only the first RAT, attempting to detect only the first RAT on the frequency channel; and
when the suspected bandwidth of the frequency channel matches both the first RAT and the second RAT, initially attempting to detect one of the first and second RATs on the frequency channel, and subsequently attempting to detect the other of the first and second RATs on the frequency channel.

4. The method according to claim 1, wherein scanning the entries comprises defining the scanning order so as to alternate between a first predefined number of the entries corresponding to the first RAT and a second predefined number of the entries corresponding to the second RAT.

5. The method according to claim 1, wherein scanning the entries comprises, in response to successfully detecting one of the carriers on a given frequency channel, removing from the list one or more entries whose frequency channels overlap the given frequency channel at least partially.

6. The method according to claim 5, wherein removing the entries comprises removing all the entries whose frequency channels overlap the given frequency channel at least partially, irrespective of the RATs of the removed entries.

7. The method according to claim 1, comprising defining the scanning order for alternating between the RATs based on a-priori information relating to RATs operating in the frequency band.

8. A method, comprising:
in a mobile communication terminal, receiving signals in a frequency band;
based on the received signals, generating one or more lists of entries by estimating a power spectrum of the frequency band and processing the estimated power spectrum so as to generate the lists, each entry specifying a respective frequency channel suspected of containing a carrier of a respective Radio Access Technology (RAT);
scanning at least some of the entries in accordance with a scanning order that alternates from a first RAT to a second RAT before scanning all the entries of the first RAT, and, for each scanned entry, detecting whether the respective frequency channel actually contains the carrier of the respective RAT; and
outputting a detection of the carriers in the frequency band.

9. Apparatus, comprising:
a receiver front end, which is configured to receive signals in a frequency band; and
processing circuitry, which is configured to generate, based on the received signals, one or more lists of entries, each entry specifying a respective frequency channel suspected of containing a carrier of a respective Radio Access Technology (RAT), to generate respective likelihood scores for the entries, to scan at least some of the entries in accordance with a scanning order that traverses the lists in descending order of the likelihood scores and alternates from a first RAT to a second RAT before scanning all the entries of the first RAT, and to detect, for each scanned entry, whether the respective frequency channel actually contains the carrier of the respective RAT.

10. The apparatus according to claim 9, wherein the processing circuitry is configured to estimate a power spectrum of the frequency band, and to process the estimated power spectrum so as to generate the lists.

11. The apparatus according to claim 9, wherein the processing circuitry is configured to attempt to decode, on the frequency channel of a scanned entry, concurrently, first and second RAT identification codes in accordance with the first and second RATs, respectively.

12. The apparatus according to claim 9, wherein the processing circuitry is configured, when a suspected bandwidth of the frequency channel of a scanned entry matches only the first RAT, to attempt to detect only the first RAT on the frequency channel, and when the suspected bandwidth of the frequency channel matches both the first RAT and the second RAT, to initially attempt to detect one of the first and second RATs on the frequency channel, and to subsequently attempt to detect the other of the first and second RATs on the frequency channel.

13. The apparatus according to claim 9, wherein the processing circuitry is configured to define the scanning order so as to alternate between a first predefined number of the entries corresponding to the first RAT and a second predefined number of the entries corresponding to the second RAT.

14. The apparatus according to claim 9, wherein, in response to successfully detecting one of the carriers on a given frequency channel, the processing circuitry is configured to remove from the list one or more entries whose frequency channels overlap the given frequency channel at least partially.

15. The apparatus according to claim 14, wherein the processing circuitry is configured to remove all the entries whose frequency channels overlap the given frequency channel at least partially, irrespective of the RATs of the removed entries.

16. The apparatus according to claim 9, wherein the processing circuitry is configured to define the scanning order for alternating between the RATs based on a-priori information relating to RATs operating in the frequency band.

17. A mobile communication terminal comprising the apparatus of claim 9.

18. A chipset for processing signals in a mobile communication terminal, comprising the apparatus of claim 9.

* * * * *